(12) United States Patent
Aoba

(10) Patent No.: US 9,483,714 B2
(45) Date of Patent: Nov. 1, 2016

(54) IMAGE PROCESSING APPARATUS AND IMAGE PROCESSING METHOD

(71) Applicant: CANON KABUSHIKI KAISHA, Tokyo (JP)

(72) Inventor: Masato Aoba, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/204,198

(22) Filed: Mar. 11, 2014

(65) Prior Publication Data

US 2014/0294292 A1 Oct. 2, 2014

(30) Foreign Application Priority Data

Mar. 29, 2013 (JP) ................. 2013-074860

(51) Int. Cl.
G06K 9/62 (2006.01)
G06K 9/00 (2006.01)
G06K 9/46 (2006.01)

(52) U.S. Cl.
CPC ......... G06K 9/6255 (2013.01); G06K 9/00208 (2013.01); G06K 9/4661 (2013.01); G06K 2209/19 (2013.01)

(58) Field of Classification Search
None
See application file for complete search history.

(56) References Cited

U.S. PATENT DOCUMENTS

| 8,217,961 | B2 | 7/2012 | Chang |
| 8,437,537 | B2 | 5/2013 | Chang et al. |
| 2003/0128207 | A1* | 7/2003 | Sawada ................. G06T 7/0055 345/419 |
| 2010/0245355 | A1* | 9/2010 | Chang .................. G06T 7/0044 345/426 |
| 2010/0296724 | A1* | 11/2010 | Chang ................ G06K 9/00208 382/154 |
| 2014/0198951 | A1* | 7/2014 | Aoba .................... G06K 9/6807 382/103 |
| 2015/0189144 | A1* | 7/2015 | Yoshii .................. H04N 5/2351 348/46 |

FOREIGN PATENT DOCUMENTS

JP 2010-243478 A 10/2010

* cited by examiner

*Primary Examiner* — Bhavesh Mehta
*Assistant Examiner* — Narek Zohrabyan
(74) *Attorney, Agent, or Firm* — Fitzpatrick, Cella, Harper & Scinto

(57) ABSTRACT

In a case where generating a training image of an object to be used to generate a dictionary to be referred to in image recognition processing of detecting the object from an input image, model information of an object to be detected is set, and a luminance image of the object and a range image are input. The luminance distribution of the surface of the object is estimated based on the luminance image and the range image, and the training image of the object is generated based on the model information and the luminance distribution.

28 Claims, 13 Drawing Sheets

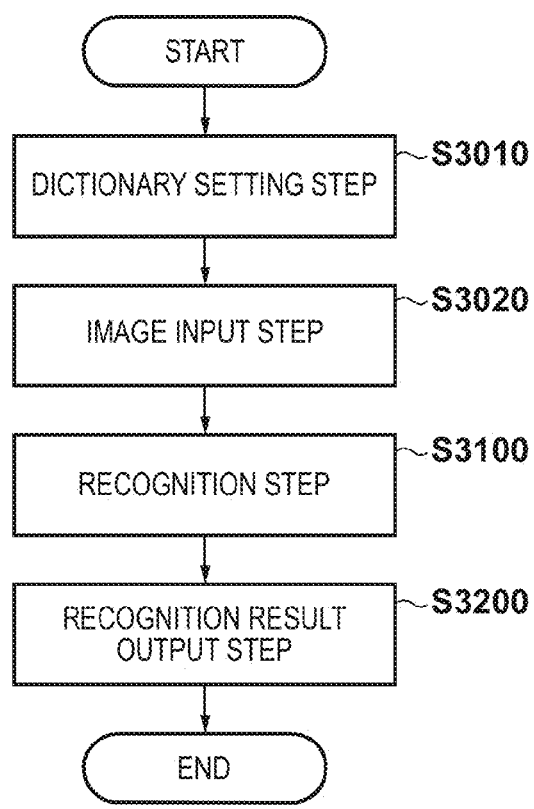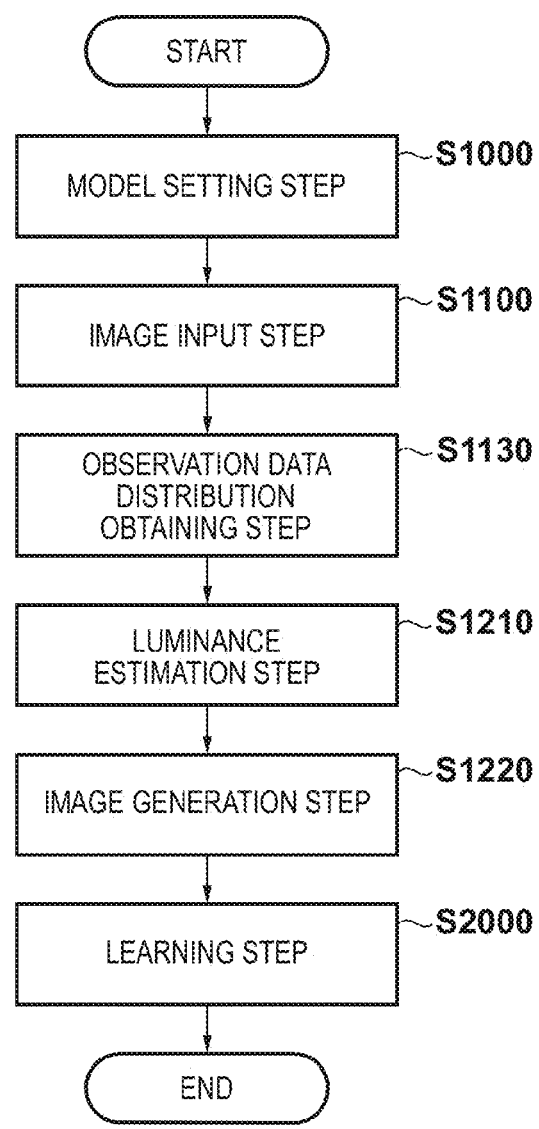

F I G. 12
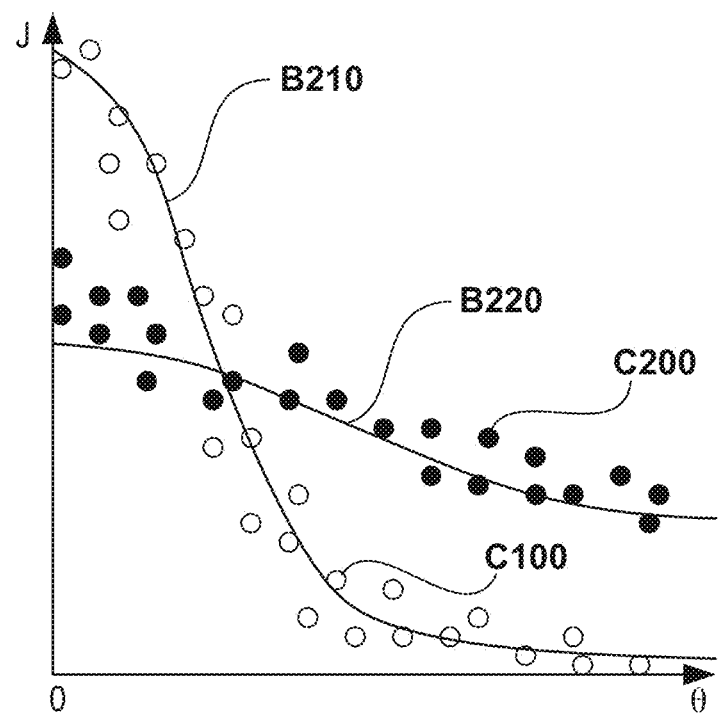
F I G. 13
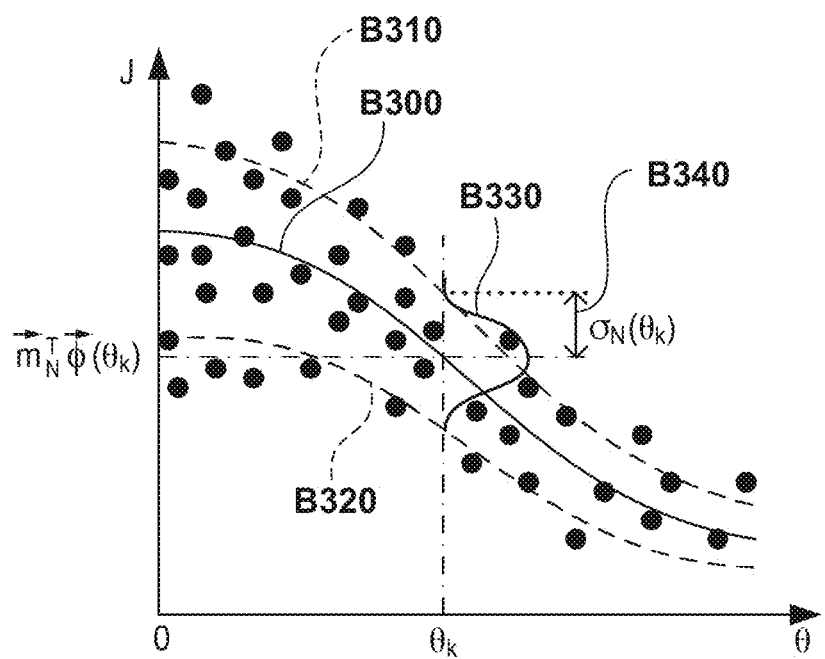

IMAGE PROCESSING APPARATUS AND IMAGE PROCESSING METHOD

BACKGROUND OF THE INVENTION

1. Field of the Invention

The present invention relates to image processing of generating a training image for generating a dictionary to be used in image recognition processing of detecting an object from an input image.

2. Description of the Related Art

Various kinds of research and development have been carried out for image recognition of detecting the image of an object to be detected from an image obtained by capturing objects. The image recognition technique is applied to various fields and used for many actual problems of, for example, face recognition and part recognition in a factory.

This image recognition can be considered from the viewpoint of pattern recognition. In the pattern recognition as well, research has been conducted on classifiers, that is, how to perform classification of input information. There have been proposed various methods such as a neural network, support vector machine (SVM), and randomized trees (RT).

In these methods, a dictionary for image recognition needs to be generated. When generating the dictionary, a training image is necessary. As for image recognition by recent industrial robots, there is also a need to recognize an object with a high degree of freedom of the three-dimensional orientation, such as part picking of detecting a desired part from a plurality of kinds of piled parts. Detection of a three-dimensional orientation requires training images corresponding to various orientations of an object.

In image recognition aiming at part picking by a robot and the like, orientation information of an object is very important. An orientation corresponding to a training image is expressed by a parameter such as Euler angles or a quaternion. It is, however, difficult to prepare the photographed image of an object in such an orientation as a training image. In general, therefore, a computer graphics (CG) image in an arbitrary orientation is generated by computer-aided design (CAD) and used as a training image.

The method of generating a training image by CAD generally handles the joints of a polygon of CAD data as edges, and generates a binary edge image. In object detection processing, edge extraction processing is performed for the photographed image of parts, and edge-based matching is executed to identify the position and orientation of an object. In this method, the result of edge extraction processing on a photographed image greatly influences the object detection performance. Generally, edge extraction processing greatly varies depending on the material of an object, the influence of ambient light, and the like, and requires very cumbersome adjustment by an operator.

In contrast, a method of generating a training image close to a photographed image by rendering is also used. In this method, it is necessary to estimate the luminance value of each surface of an object. If the bidirectional reflectance distribution function (BRDF) of an object and the state of ambient light are known, a luminance value estimated using them can be given to an object surface to generate a CG image. However, measurement by special equipment is necessary to accurately know the BRDF of an object. In addition, work for accurately acquiring an ambient light condition in an actual environment as a numerical value is required.

There is also a method of generating a training image by performing environment mapping in which a sphere is arranged in an environment. For example, to generate the training image of a mirror object, texture mapping of the image (environment map) of an ambient environment is performed for the mirror sphere arranged in the environment, thereby generating an image. However, for an object made of plastic or the like, even if the material is the same, its reflection characteristic varies depending on the mold or the surface treatment. It is therefore difficult to prepare a sphere having the same reflection characteristic as that of the object.

SUMMARY OF THE INVENTION

In one aspect, an image processing apparatus for generating a training image of an object to be used to generate a dictionary to be referred to in image recognition processing of detecting the object from an input image, comprising: a first setting unit configured to set model information of an object to be detected; a first inputting unit configured to input a luminance image of the object, and a range image; an estimation unit configured to estimate a luminance distribution of the surface of the object based on the luminance image and the range image; and a generation unit configured to generate a training image of the object based on the model information and the luminance distribution, wherein at least one of the first setting unit, the first inputting unit, the estimation unit, or the generation unit is implemented by using a processor.

According to the aspect, a training image which approximates surface luminance of an object to be detected can be easily generated by reflecting environmental conditions based on information obtained by capturing the object.

Further features of the present invention will become apparent from the following description of exemplary embodiments with reference to the attached drawings.

BRIEF DESCRIPTION OF THE DRAWINGS

FIG. 3A is a flowchart showing run-time processing.

FIG. 3B is a flowchart showing dictionary generation processing.

FIG. 12 is a graph showing an example of association of a luminance distribution function.

FIG. 13 is a graph showing an example of the predicted distribution of luminance values in the third embodiment.

DESCRIPTION OF THE EMBODIMENTS

Embodiments of the present invention will now be described with reference to the accompanying drawings. It should be noted that the following embodiments are not intended to limit the scope of the appended claims, and that not all the combinations of features described in the embodiments are necessarily essential to the solving means of the present invention.

First Embodiment

Image processing of generating a training image to be used to generate a dictionary which is referred to in image recognition processing of detecting an object from an input image will be explained below. The training image is generated to approximate the surface luminance of an object to be detected (to be referred to as a "target object" hereinafter) by reflecting environmental conditions based on information obtained by capturing the target object in an actual environment.

[Generation of Training Image]

Figure 1A:
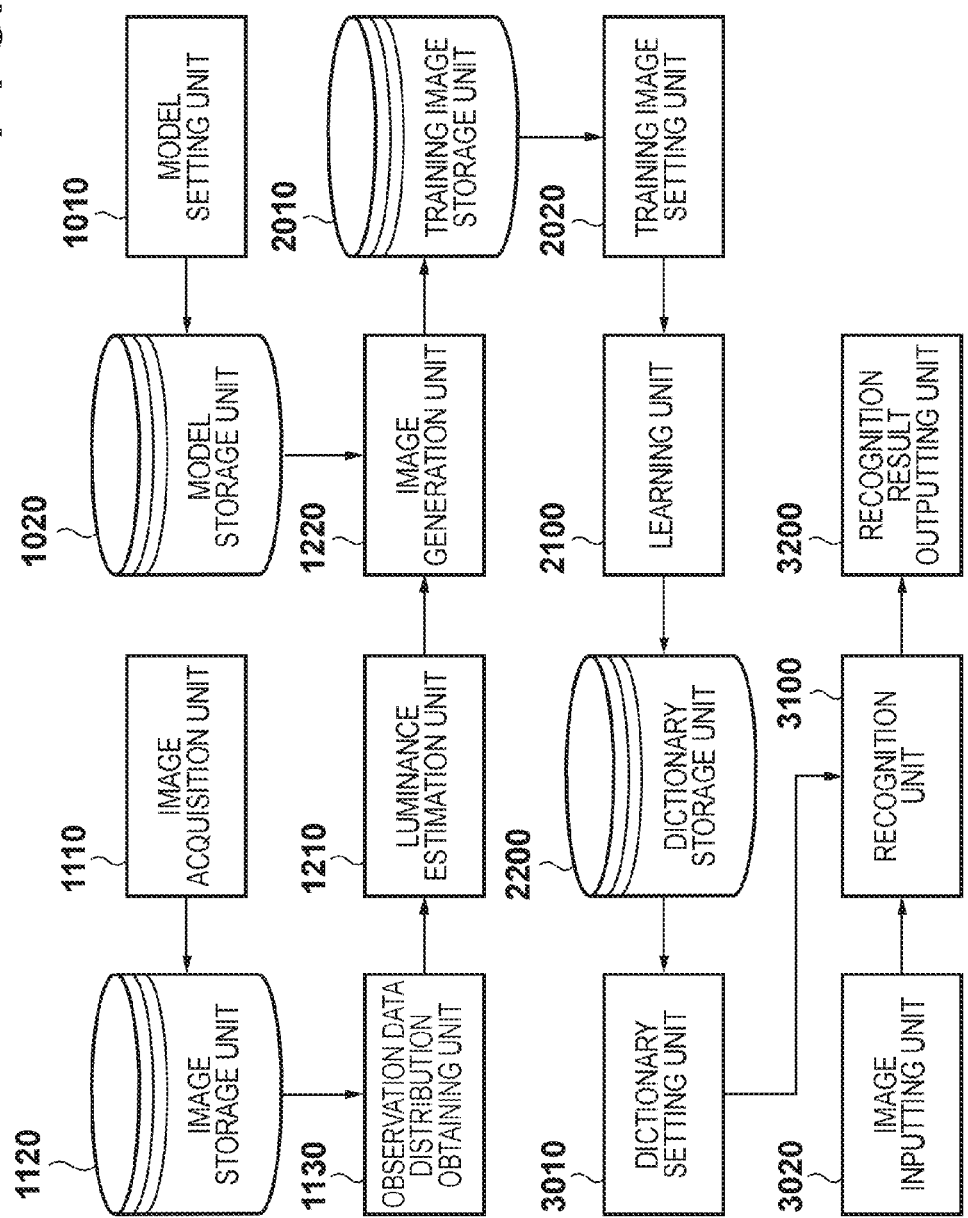
FIGS. 1A and 1B are block diagrams showing the arrangement of an image processing apparatus.

FIG. 1A shows the arrangement of an image processing apparatus which performs image recognition processing in the first embodiment.

A model setting unit 1010 sets the model of a target object and stores it in a model storage unit 1020. An image acquisition unit 1110 acquires a pre-acquired image by capturing the target object, and stores the pre-acquired image in an image storage unit 1120. An observation data distribution obtaining unit 1130 obtains the observation data distribution of luminance values from the pre-acquired image stored in the image storage unit 1120.

A luminance estimation unit 1210 estimates the luminance distribution of the surface of the target object based on the observation data distribution of luminance values. An image generation unit 1220 generates CG images of the target object in various orientations based on the model stored in the model storage unit 1020 and the luminance distribution estimated by the luminance estimation unit 1210. The generated CG images are stored as training images in a training image storage unit 2010.

A dictionary for image recognition is generated by learning processing using the generated training images. More specifically, a learning unit 2100 performs learning processing using a plurality of training images read out from the training image storage unit 2010 by a training image setting unit 2020, thereby generating a dictionary for recognizing the target object. The generated dictionary is stored in a dictionary storage unit 2200.

Run-time processing is performed using the generated dictionary. In the run-time processing, target object recognition (detection) processing is performed for an actual input image by using the dictionary generated based on the training images created by the image generation unit 1220.

In the run-time processing, a dictionary setting unit 3010 reads out the dictionary stored in the dictionary storage unit 2200, and sets it in a recognition unit 3100. An image inputting unit 3020 acquires an image by capturing a target object, and inputs it to the recognition unit 3100. The recognition unit 3100 estimates the position and orientation of the target object in the input image in accordance with the set dictionary. A recognition result outputting unit 3200 presents, as the recognition result by a predetermined method, the position and orientation of the target object estimated by the recognition unit 3100.

[Application to Robot Work]

An example in which the image processing apparatus having the above-described arrangement in the first embodiment is applied to work by a robot will be described blow.

Figure 1B:
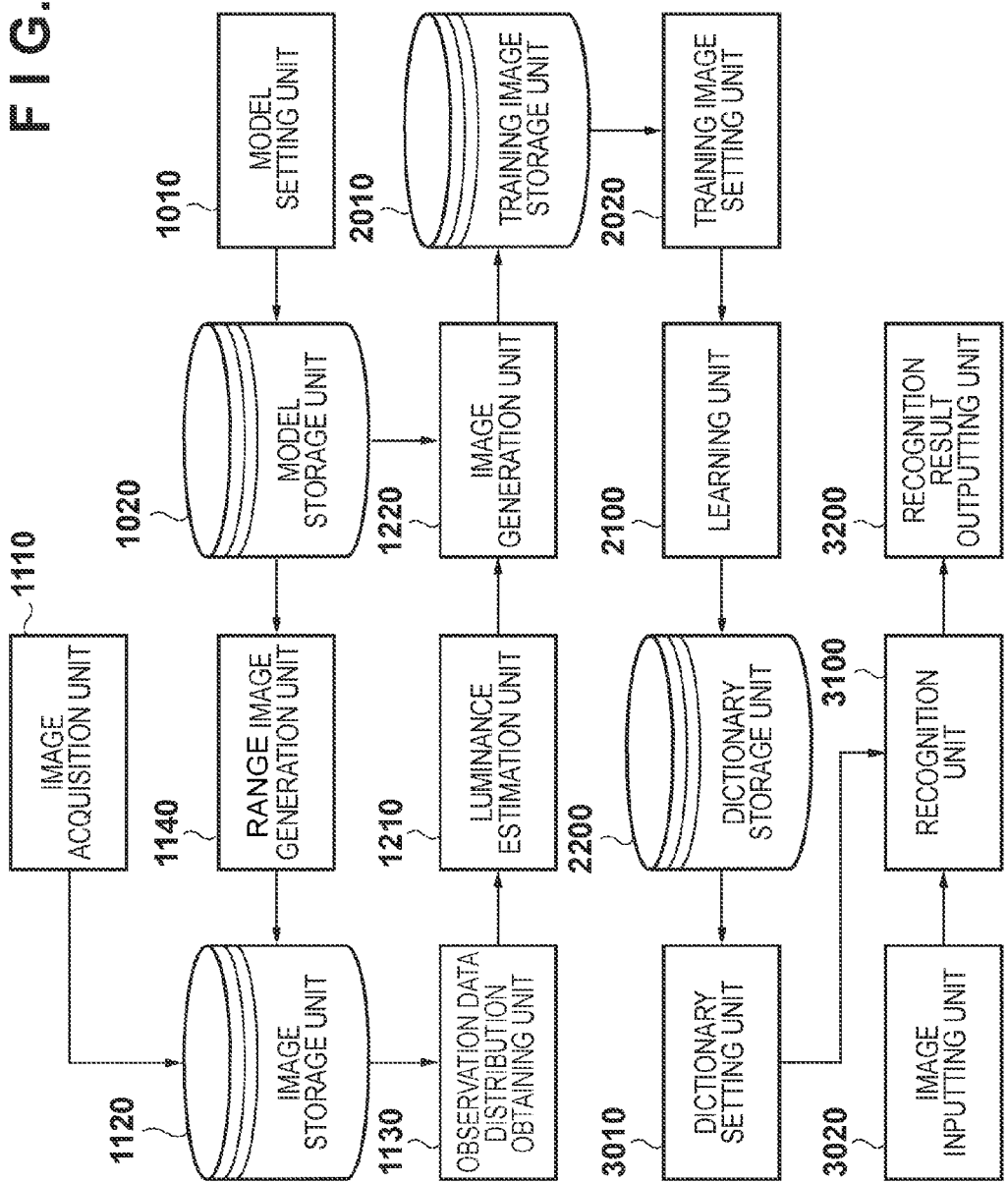
Figure 2:
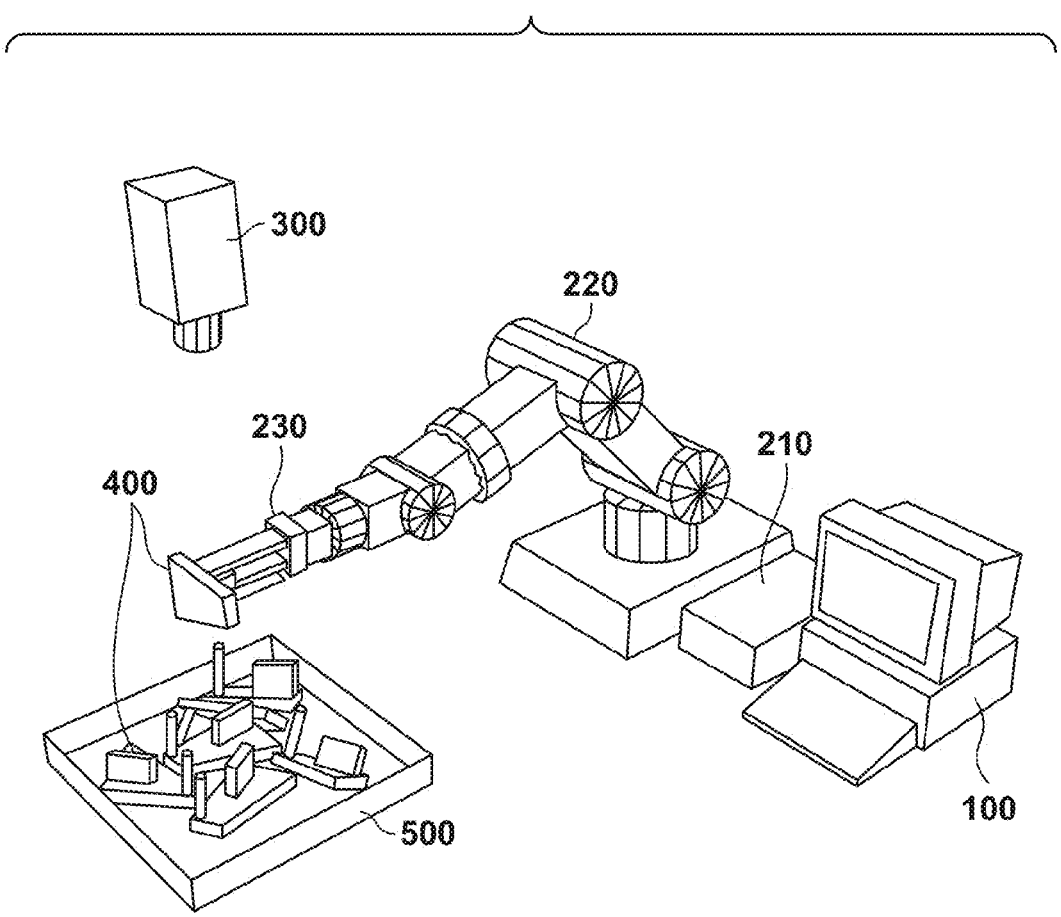
FIG. 2 is a view showing an arrangement for detecting a target object in run-time processing.

FIG. 2 shows the arrangement of an apparatus for detecting a target object in run-time processing. In FIG. 2, target objects 400 are placed on a tray 500. An image capturing apparatus 300 is a camera for obtaining distance information from image information and a capturing position, and is equivalent to the image inputting unit 3020 shown in FIGS. 1A and 1B. The image capturing apparatus 300 can be an apparatus such as a stereo camera, a Time-of-Flight (TOF) sensor, or an apparatus based on a light-section method or space encoding method using a combination of a camera and floodlight, as long as image information and distance information can be obtained at the time of capturing. When alignment with a model is performed using a tracking technique (to be described later), no distance information need be obtained, and the image capturing apparatus 300 may be constructed by only a camera. The image capturing apparatus 300 is connected to a computer 100 via a wire or wirelessly.

In the computer 100, arrangements equivalent to the recognition unit 3100 and recognition result outputting unit 3200 shown in FIGS. 1A and 1B are incorporated as programs or circuits. A storage device such as a hard disk arranged inside or outside the computer 100 is equivalent to the dictionary storage unit 2200. Note that the recognition unit 3100, recognition result outputting unit 3200, and dictionary storage unit 2200 are not limited to the arrangements as described above. For example, an arrangement obtained by combining a computer and server apparatus via a network, or a circuit built in a camera and a memory (or a storage medium such as a detachable memory card) may be used.

The computer 100 is electrically connected to a robot controller 210. The robot controller 210 is electrically connected to a robot arm 220. The robot arm 220 operates upon receiving an instruction signal from the robot controller 210. The robot arm 220 includes an end effector 230 for performing predetermined work such as gripping work on a work target object.

[Run-Time Processing]

Run-time processing in the arrangement shown in FIG. 2 will be described with reference to the flowchart of FIG. 3A. As described above, in run-time processing, target object recognition (detection) processing is performed for an input image by using a dictionary based on training images created by the arrangement in the first embodiment. The arrangement shown in FIG. 2 is configured to capture objects conveyed one after another in, for example, a factory and recognize their positions and orientations. However, the present invention is not limited to the aforementioned run-time processing. For example, when the present invention is applied to face recognition, even a scene in which a person is captured by a camera to perform face recognition can also be regarded as run-time processing.

In dictionary setting step S3010 of FIG. 3A, the dictionary setting unit 3010 reads out a dictionary which has been generated in advance and stored in the dictionary storage unit 2200, and sets the dictionary in the recognition unit 3100. Note that details of dictionary generation will be described later.

Then, in image input step S3020, the image capturing apparatus 300 captures the target object 400 placed on the tray 500. The obtained image (luminance image) and distance information are input to the computer 100.

In recognition step S3100, the recognition unit 3100 performs image recognition processing for an input image by using the dictionary set by the dictionary setting unit 3010, and estimates the position and orientation of the target object 400. The estimated position and orientation are input as the recognition result to the recognition result outputting unit 3200.

The image recognition processing performed here is processing of classifying the position and orientation of the target object 400 by a classifier. The dictionary used at this time defines the classifier. The classifier defined by the dictionary determines a class to which the target object 400 captured at part of the image belongs, thereby recognizing the position and orientation. Note that a method used as the classifier is not particularly limited, and any existing method is applicable. For example, a classifier by SVM or RT may be used.

Image data to be input to the classifier may be image data obtained by performing predetermined image processing for an input image. The image processing performed for an input image is a general term of processing of converting an input image into a format easy to handle by the classifier, and the processing contents are not limited. The image processing includes, for example, noise removal using a Gaussian filter, median filter, or the like, and edge extraction using a Sobel filter, LoG filter, Laplacian filter, Canny edge detector, or the like. The image processing also includes pre-processes such as enlargement/reduction and gamma correction, and feature extraction processes such as histograms of oriented gradients (HOG) and scale-invariant feature transform (SIFT). The image processing is not limited to a selected one of these processes, and includes even a combination of processes of, for example, performing noise removal by a Gaussian filter and then performing edge extraction by a Sobel filter.

In recognition result output step S3200, the recognition result outputting unit 3200 encodes, from the estimated position and orientation of the target object 400 serving as the recognition result, an instruction to cause the robot to perform predetermined work. Then, the recognition result outputting unit 3200 outputs the instruction to the robot controller 210. The robot controller 210 decodes the input instruction, and operates the robot arm 220 and end effector 230 in accordance with the instruction to perform predetermined work for the recognized work target object (target object 400).

When recognition step S3100 is repetitively performed in run-time processing, the dictionary set in dictionary setting step S3010 is held in a memory (not shown) so that dictionary setting step S3010 need not be repeated. In other words, it is only necessary to repetitively execute image input step S3020 and subsequent steps in this case.

[Dictionary Generation Processing (Learning Processing)]

A dictionary for detecting the target object 400 is prepared in advance when performing the above-described run-time processing. Processing for generating a dictionary will be explained below. Since the dictionary is used again in repetitive run-time processing, it suffices to perform dictionary generation processing only once.

Dictionary generation processing in the first embodiment is performed by the arrangement shown in FIG. 1A. Note that all the image generation unit 1220, learning unit 2100, and recognition unit 3100 in FIG. 1A are implemented as programs in the computer 100 shown in FIG. 2. However, the present invention is not limited to this example, and these programs may be implemented in a computer other than the computer 100 used in run-time processing, or a computer mounted in the image capturing apparatus 300.

The following description assumes that the image storage unit 1120, training image storage unit 2010, and dictionary storage unit 2200 are assigned to a hard disk incorporated in or connected to the computer 100. However, the present invention is not limited to this example, and the image storage unit 1120, training image storage unit 2010, and dictionary storage unit 2200 may be implemented in a hard disk incorporated in or connected to a computer other than the computer 100 used in run-time processing, or a memory incorporated in the image capturing apparatus 300.

The image acquisition unit 1110 is implemented in the image capturing apparatus 300 or computer 100 shown in FIG. 2 as a program for controlling the image capturing apparatus 300.

Dictionary generation processing will be explained according to the flowchart of FIG. 3B.

In model setting step S1000, the model setting unit 1010 sets the model of the target object 400, and stores the model in the model storage unit 1020. The model is information including information necessary to generate the CG image of the target object 400, which will be described later. The model is, for example, the CAD data or polygon model of the target object 400.

In image input step S1100, the image acquisition unit 1110 captures the target object 400 arranged on the tray 500 by using the image capturing apparatus 300, thereby acquiring a luminance image and distance information (range image) of each pixel position in the luminance image. The image acquisition unit 1110 stores a combination of the acquired luminance image and range image as a pre-acquired image in the image storage unit 1120.

The pre-acquired image is an image used when the image generation unit 1220 generates a training image. The pre-acquired image is desirably captured under the same environmental conditions as those in run-time processing, that is, the same environmental conditions as those in image input step S3020. For example, the illumination conditions in capturing a pre-acquired image are desirably almost the same illumination conditions as those in image input step S3020.

Also, the pre-acquired image is an image obtained by capturing a state in which many target objects 400 are piled at random. Although at least one pre-acquired image is sufficient, the following description assumes that five pre-acquired images or so are captured. When capturing a plurality of pre-acquired images, it is desirable that the position and orientation of the target object 400 are different in the respective capturing states to obtain many variations of the position and orientation.

Note that the same image capturing apparatus 300 as that in run-time processing is ideally used to capture a pre-acquired image. However, a pre-acquired image may be acquired by another image capturing apparatus as long as the positional relationship between the image capturing apparatus 300 and the tray 500 and the illumination conditions are similar. As the pre-acquired image, a single target object 400 may be captured in various orientations. In this case, a larger number of (for example, about 20) images are desirably captured as pre-acquired images, compared to a case in which the piled target objects 400 are captured.

Then, in observation data distribution obtaining step S1130, the observation data distribution obtaining unit 1130 obtains, based on the pre-acquired images, an observation data distribution representing the distribution of luminance values. In the pre-acquired image stored in the image storage unit 1120, a camera coordinate system position (Xj, Yj, Zj) is added as a range image to an arbitrary pixel j in the luminance image. The camera coordinate system is a capturing space defined by the X-, Y-, and Z-axes using the image capturing apparatus 300 as an origin.

The observation data distribution obtaining unit 1130 calculates a normal vector $\vec{N}$ in the pixel j by performing plane approximation for the camera coordinate system positions of the pixel j and several neighboring points (for example, the pixel j and eight adjacent pixels, that is, a total of nine pixels). By calculating the normal vectors $\vec{N}$ for all pixels in the existence region (for example, the internal region of the tray 500) of the target object 400 in the pre-acquired image, an observation data distribution representing the correspondence between the luminance value and the normal direction of the surface can be obtained.

Although the observation luminance value will be described as a pixel value, it can generally be a luminance value at a predetermined position in an image. Thus, the observation luminance value may not be the luminance value of a single pixel, and may be the average value of pixel values in a local region made up of several pixels, a luminance value after a noise removal filter, or the like.

Then, in luminance estimation step S1210, the luminance estimation unit 1210 estimates the surface luminance distribution of the target object 400 based on the observation data distribution obtained from the pre-acquired images. To generate a training image from CAD data of the target object 400 by CG, it is necessary to estimate a parameter (luminance distribution parameter) in a surface luminance distribution model obtained by modeling the surface luminance distribution of the target object 400.

As the luminance distribution parameter, the following parameters are conceivable. For example, assume that the light source is single parallel light, and the surface of the target object 400 causes Lambert reflection (diffuse reflection). In this case, the surface luminance distribution of the target object 400 can be approximated by a relatively simple luminance distribution model. This approximation example will be explained with reference to FIG. 4.

Figure 4:
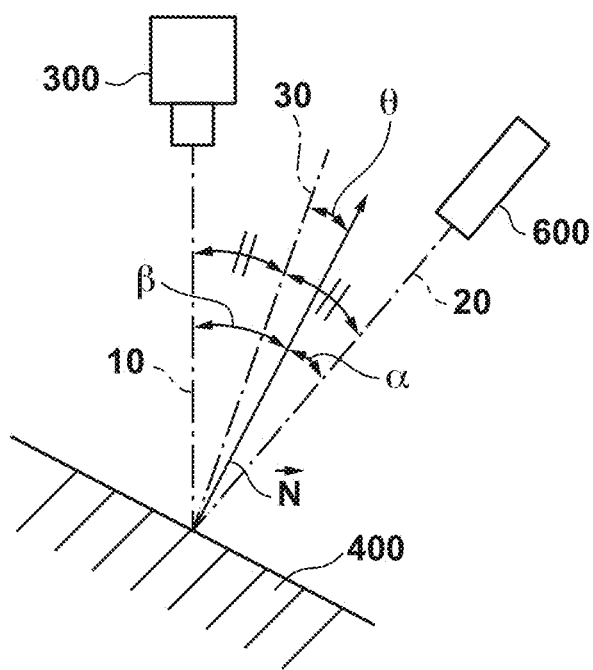
FIG. 4 is a view for explaining the optical characteristic of the surface of a target object.

FIG. 4 shows a state in which a light source 600 irradiates the target object 400 with light and the image capturing apparatus 300 receives the reflected light. The intermediate direction between a light source direction vector $\vec{L}=(\vec{Lx}, \vec{Ly}, \vec{Lz})$ of a light source axis 20 in the camera coordinate system from the surface of the target object 400 to the light source 600, and a direction vector $\vec{V}=(\vec{Vx}, \vec{Vy}, \vec{Vz})$ of a camera optical axis 10 is defined as a reflection center axis 30. Then, a direction vector $\vec{H}=(\vec{Hx}, \vec{Hy}, \vec{Hz})$ of the reflection center axis 30 is given by:

$$\vec{H}=(\vec{L}+\vec{V})/\|\vec{L}+\vec{V}\| \tag{1}$$

Let θ be the angle made by the normal vector $\vec{N}=(\vec{Nx}, \vec{Ny}, \vec{Nz})$ at an arbitrary surface position of the target object 400 and the direction vector $\vec{H}$ of the reflection center axis 30. Then, the angle θ is given by:

$$\theta=\cos^{-1}\{\vec{H}\cdot\vec{N}/(\|\vec{H}\|\|\vec{N}\|)\} \tag{2}$$

At this time, a luminance value J at an arbitrary surface position of the target object 400 can be approximated as a function of θ using a Gaussian function:

$$J(\theta)=C\cdot\exp(-\theta^2/m) \tag{3}$$

In equation (3), C and m are luminance distribution parameters representing the intensity of the entire luminance distribution and the spread of the luminance distribution, respectively. By estimating C and m, the approximation of the luminance distribution model is performed.

Since a single light source is assumed, the normal vector $\vec{N}$ j of a pixel having a maximum luminance value out of the obtained observation values is estimated as the light source direction vector $\vec{L}=(\vec{Lx}, \vec{Ly}, \vec{Lz})$. At this time, for example, luminance values may be averaged using neighboring pixels in consideration of an observation error or the saturation of the luminance. As a matter of course, when the light source direction vector $\vec{L}$ is known, the light source direction need not be estimated.

Figure 5:
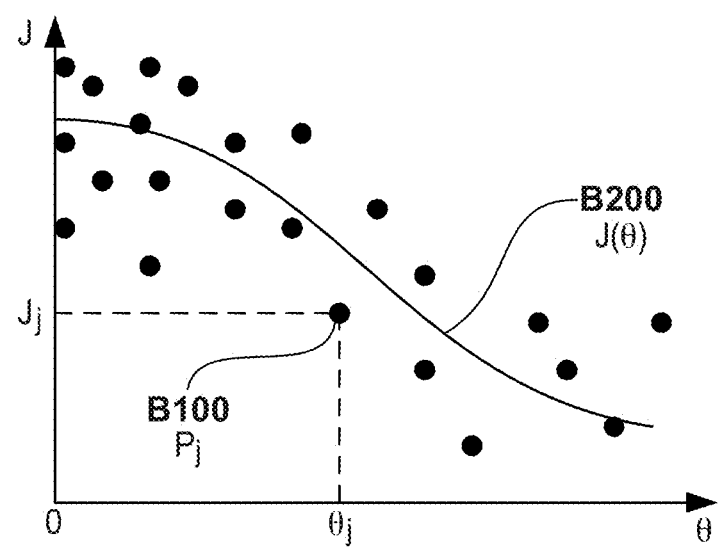
FIG. 5 is a graph showing an observation example of a luminance distribution on a target object.

When the luminance distribution is approximated using a Gaussian function as represented by equation (3), the direction vector $\vec{H}$ of the reflection center axis 30 is calculated according to equation (1) with respect to the light source direction vector $\vec{L}$. Hence, an angle $\theta_j$ of each pixel j from the reflection center axis 30 is obtained based on equation (2). A pair of the angle $\theta_j$ and luminance value $J_j$ in the pixel j will be referred to as an observation point $p_j=(\theta_j, J_j)$. By calculating the observation points $p_j$ for all pixels j, an observation distribution as shown in FIG. 5 can be obtained. In FIG. 5, a data point B100 is an observation point $p_j$ having the angle $\theta_j$ and luminance value $J_j$.

By performing maximum likelihood fitting of the model based on equation (3) for the observation distribution shown in FIG. 5, an estimated model B200 of the surface luminance distribution of the target object 400 can be obtained. First, an error function E is defined as the sum of squares of the difference between an estimated value and an observation value by:

$$E=\Sigma_j\{J(\theta_j)-J_j\}^2 \tag{4}$$

The maximum likelihood fitting is regarded as the minimization problem of the error function E. Then, since the error function E is a downward-convex quadratic function of the parameter C, the update equation of the parameter C can be obtained by solving:

$$\partial E/\partial C=0 \tag{5}$$

$$C=\Sigma_j J_j\exp(-\theta_j^2/m)/\Sigma_j\exp(-2\theta_j^2/m) \tag{6}$$

As for the parameter m, γ=1/m to simplify calculation, and the parameter m is obtained as the optimization problem of γ. The error function E is not a convex function of γ. Thus, the error function E is decomposed and solved for each data, as represented by:

$$Ej=\{J(\theta_j)-J_j\} \tag{7}$$

When equation (7) is solved by a steepest descent method, the sequential update formula is given by equation (8), which is called the Robbins-Monro procedure:

$$\gamma^{new}=\gamma^{old}-\eta\cdot\partial E_j/\partial\gamma=\gamma^{old}-\eta[-2C\theta_j^2\exp(-\gamma\theta_j^2)\{C\theta_j^2\exp(-\gamma_j^2)-J_j\}] \tag{8}$$

In equation (8), the coefficient η is a constant defined by a positive value and is generally given as a reciprocal of the number of observation data.

An example has been described, in which when the surface of the target object 400 causes diffuse reflection, it can be approximated by a luminance distribution model based on a Gaussian function by estimating the luminance distribution parameters C and m. When a mirror reflection component on the surface of the target object 400 is taken into consideration, a Torrance-Sparrow luminance distribution model as represented by equation (9) is applied:

$$J(\theta,\alpha,\beta)=K_d \cos \alpha + K_s(1/\cos \beta)\exp(-\theta^2/m)$$

where $K_d$, $K_s$, and $m$ are luminance distribution parameters in this model.

When this model is applied to FIG. 4, $\theta$ is the angle made by the normal vector $\vec{N}$ at the surface position of the target object 400 and the direction vector $\vec{H}$ of the reflection center axis 30, similar to $\theta$ in equation (2). In addition, $\alpha$ is the angle made by the normal vector $\vec{N}$ and the light source direction vector $\vec{L}$, and $\beta$ is the angle made by the normal vector $\vec{N}$ and the direction vector $\vec{V}$ of the camera optical axis 10. $\alpha$ and $\beta$ are given by:

$$\alpha = \cos^{-1}\{\vec{L}\cdot\vec{N}/(\|\vec{L}\|\|\vec{N}\|)\} \quad (10)$$

$$\beta = \cos^{-1}\{\vec{V}\cdot\vec{N}/(\|\vec{V}\|\|\vec{N}\|)\} \quad (11)$$

The angles $\alpha_j$ and $\beta_j$ in equation (9) corresponding to each observation pixel j can be obtained from equations (10) and (11), and the observation distribution of the luminance value $J_j$ corresponding to $\theta_j$, $\alpha_j$, and $\beta_j$ can be obtained. By performing maximum likelihood fitting of the model in equation (9) for the observation distribution, the estimated model of the surface luminance distribution of the target object 400 can be obtained.

If a plurality of light sources exist, or disturbance light due to ambient light or the like exists, the luminance distribution may be approximated by a nonparametric regression model $J(\vec{N})$ which receives the normal vector $\vec{N}$ and outputs the luminance value J. A predetermined nonparametric model is learned using the luminance value $J_j$ as a teacher value for the normal vector $\vec{N}_j$ concerning each pixel j at an observation value, thereby obtaining a luminance distribution estimation function. As the nonparametric regression model, various methods such as SVM, support vector regression (SVR), and neural network are usable. When these nonparametric models are used, the light source direction need not be estimated in advance before fitting.

A luminance distribution estimation function considering the difference in illuminance condition depending on the position can also be obtained by giving a camera coordinate system position (X, Y, Z) as an argument of the regression model and approximating $J(\vec{N}, X, Y, Z)$. When luminance values are obtained by multiple channels, luminance distributions are estimated separately for the respective channels. There are multiple channels when, for example, an RGB color image or an invisible optical image by infrared light or ultraviolet light is included as additional information.

If the surface luminance of the target object 400 is estimated in luminance estimation step S1210, the image generation unit 1220 generates a plurality of training images necessary to generate a dictionary in image generation step S1220. The training image is generated as a CG image based on the model (for example, CAD data) of the target object 400 set in model setting step S1000. For example, if the optical characteristic of the surface of the target object 400 that is represented by BRDF, and light source information in the work environment are known, appearances of the target object 400 in various orientations can be reproduced by CG images from the model using a known rendering technique.

Figure 6:
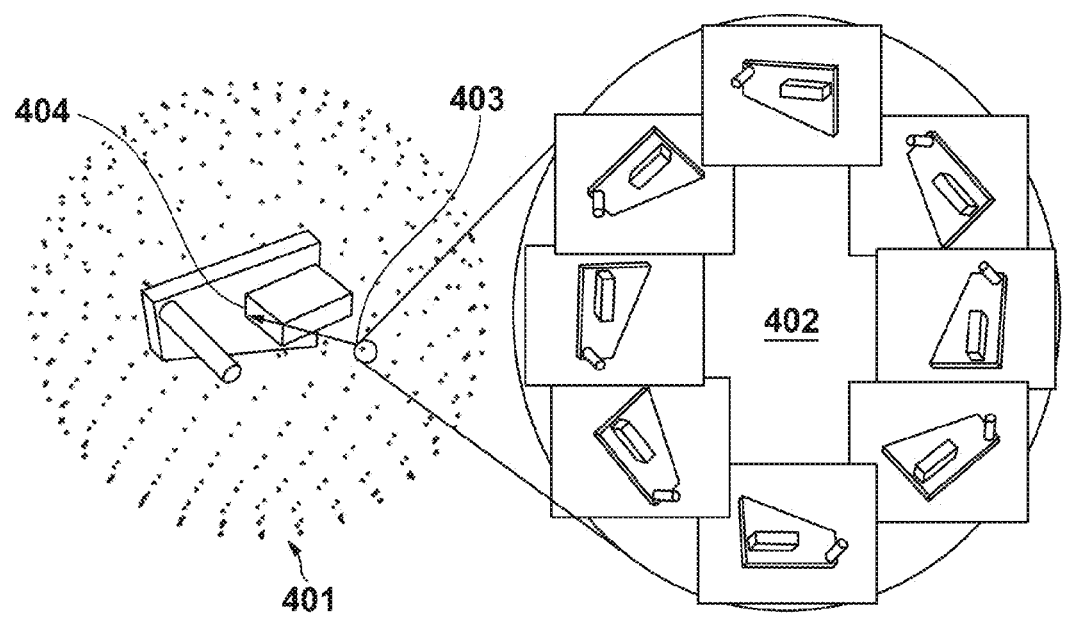
FIG. 6 is a view showing the state of generation of a training image by a CG image.

FIG. 6 shows the state of generation of a training image by a CG image. As shown in FIG. 6, training images are generated in variations based on respective viewpoints 403 on the surface of a geodesic dome 401 about an object center 404 of the target object 400 and in-plane rotation 402 of images at the respective viewpoints 403. An index of orientation class is given to each training image. For example, when training images are generated in variations based on 72 viewpoints and in-plane rotation by every 30°, a classifier of 72×(360/30)=864 classes is learned as the dictionary.

The image generation unit 1220 performs projective transformation corresponding to each orientation for the model of the target object 400 that is stored in the model storage unit 1020. The normal direction (normal direction of the surface) of a point on the model that corresponds to each pixel after projective transformation is calculated. Then, a luminance value corresponding to the normal direction is given according to the result obtained in luminance estimation step S1210, thereby generating a training image corresponding to each orientation.

In learning step S2000, the learning unit 2100 generates a dictionary complying with the format of the classifier used in the recognition unit 3100 by using the training images of a plurality of orientations generated in image generation step S1220. The generated dictionary is stored in the dictionary storage unit 2200.

In this manner, a luminance image which approximates the surface luminance of the target object 400 by reflecting environmental conditions such as the illumination can be easily generated based on luminance information and distance information obtained by capturing the piled target objects 400 in an actual environment or capturing a single target object 400 in a plurality of orientations. The approximated luminance image is used as a training image to generate a dictionary.

Modification of Embodiment

The first embodiment has described an example in which a luminance image and range image including the target object 400 are acquired from capturing by the image capturing apparatus 300. However, the present invention is applicable to even a case in which the image capturing apparatus 300 does not have the distance measurement function. A modification when the image capturing apparatus 300 cannot acquire a range image will be explained.

FIG. 1B shows the arrangement of an image processing apparatus when a range image is generated by estimating the position and orientation of the target object 400 by using a tracking technique. Note that the same reference numerals as those in FIG. 1A denote the same parts, and a description thereof will not be repeated.

The arrangement shown in FIG. 1B includes a range image generation unit 1140 which generates a range image. The user superposes the model of the target object 400 on a luminance image captured by the image capturing apparatus 300, and sets a rough position and rough orientation. Based on the rough position and orientation set by the user, the range image generation unit 1140 performs alignment between the luminance image and the model by using a tracking technique. Based on the aligned model, the range image generation unit 1140 generates a range image by estimating the position, in the camera coordinate system, of each pixel in a region capturing the target object 400.

Second Embodiment

The second embodiment according to the present invention will be described. The first embodiment has been described on the premise that the target object is an object of a single color. However, the target object sometimes has a plurality of colors. For example, part of a target object is made of black plastic and another part is made of white plastic. In this case, the luminance characteristic changes depending on the portion of the target object. The second embodiment will explain an example in which a training image is generated for a target object having a plurality of luminance characteristics.

The basic arrangement for performing image recognition processing in the second embodiment is the same as that of FIG. 1A in the first embodiment, except for details of processing by a luminance estimation unit 1210 which estimates the surface luminance of a target object from an observation data distribution.

Figure 8:
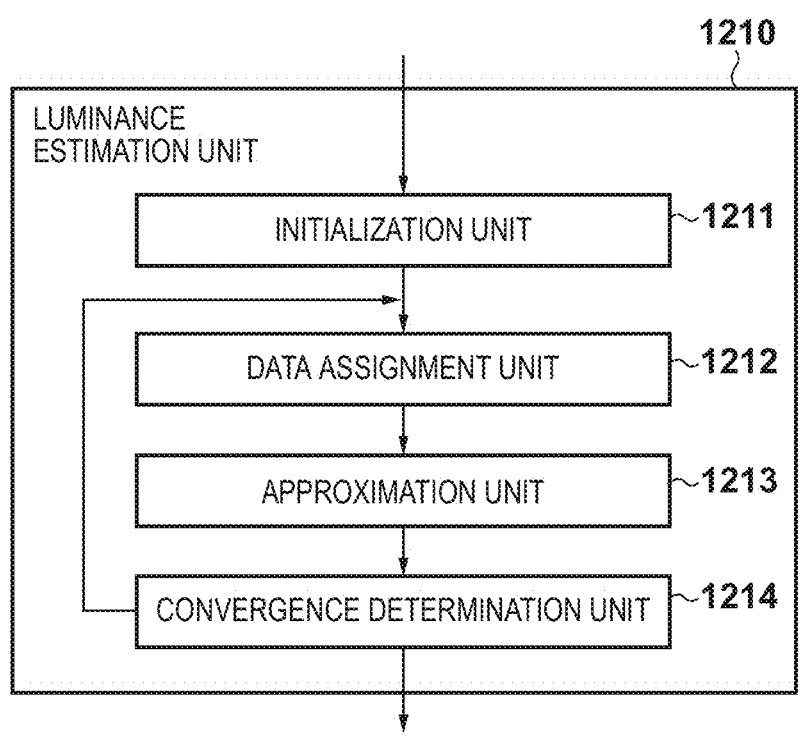
FIG. 8 is a block diagram showing the arrangement of a luminance estimation unit in the second embodiment.

FIG. 8 shows the arrangement of the luminance estimation unit 1210 in the second embodiment. Note that processing by an image generation unit 1220, subsequent processing, and run-time processing are the same as those in the first embodiment, and a description thereof will not be repeated.

The luminance estimation unit 1210 in the second embodiment includes an initialization unit 1211, data assignment unit 1212, approximation unit 1213, and convergence determination unit 1214. The initialization unit 1211 initializes a plurality of functions of approximating a luminance distribution for an observation data distribution input from an observation data distribution obtaining unit 1130. The data assignment unit 1212 assigns the observation data distribution to one of a plurality of functions. The approximation unit 1213 makes a luminance distribution function fit the assigned observation data distribution. The convergence determination unit 1214 determines whether luminance distribution estimation calculation has converged.

[Luminance Estimation Processing]

In the second embodiment as well as the first embodiment, a dictionary for detecting a target object is generated from generated training images. Dictionary generation processing in the second embodiment is the same as the sequence of FIG. 3B in the first embodiment, except for details of processing in luminance estimation step S1210 and subsequent processing. In luminance estimation step S1210 according to the second embodiment, the surface luminance of a target object 400 is estimated as follows based on an observation data distribution obtained from pre-acquired images.

First, an observation data distribution concerning the correspondence between the luminance value and the normal direction of the surface is obtained from an image stored in an image storage unit 1120. An example of the approximation of a luminance distribution model will be explained with reference to FIG. 4 on the assumption that the light source is single parallel light and the surface of a part causes Lambert reflection.

In FIG. 4, a direction vector $\vec{H}$ of a reflection center axis 30 is given by equation (1), as in the first embodiment. The angle $\theta$ made by the normal vector $\vec{N}$ at the surface position of the target object 400 and the direction vector $\vec{H}$ is given by equation (2), as in the first embodiment. At this time, if the surface luminance characteristic of the target object 400 is represented by combinations of T types of characteristics, the t-th (t=1, . . . , T) luminance distribution function $J_t(\theta)$ can be approximated by a Gaussian function:

$$J_t(\theta) = C_t \cdot \exp(-\theta^2/m_t) \tag{12}$$

where $C_t$ and $m_t$ are parameters representing the intensity of the entire luminance distribution and the spread of the luminance distribution, respectively.

Figure 7:
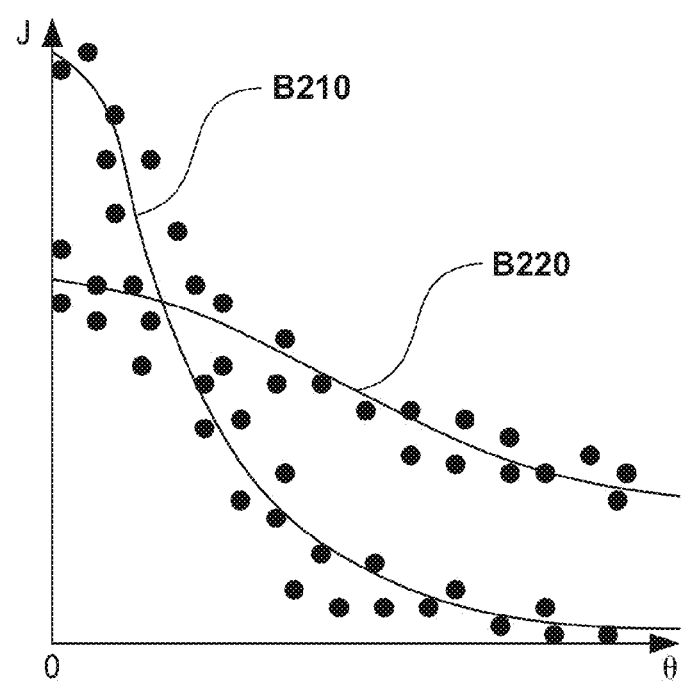
FIG. 7 is a graph showing an observation example of a luminance distribution on a target object having a plurality of colors.

The luminance distribution characteristic of the target object 400 is approximated by T luminance distribution functions $J_t(\theta)$ (t=1, . . . , T). FIG. 7 shows an example of the luminance distribution function for T=2. In FIG. 7, curves B210 and B220 are curves corresponding to luminance distribution functions estimated for t=1, 2. As for the T value, if the number by which the target object 400 can be decomposed into portions of different materials is known in advance from CAD data or the like, this number can be decided as the T value. Although T is set in advance in the following description, processing when T is unknown will be described later.

Figure 9B:
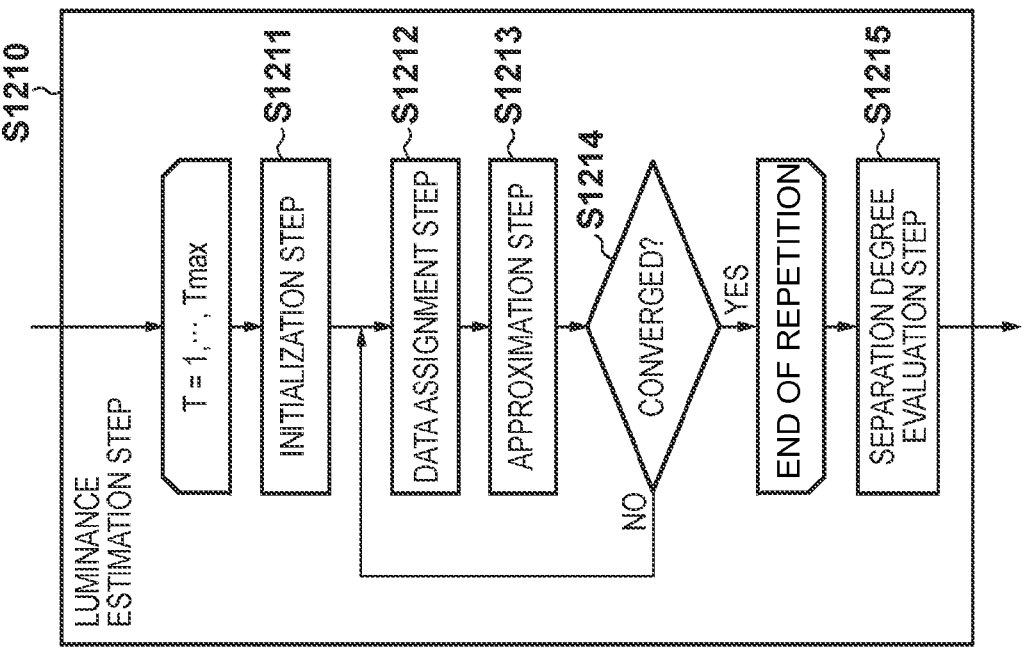
FIGS. 9A and 9B are flowcharts showing luminance estimation processing in the second embodiment.
Figure 9A:
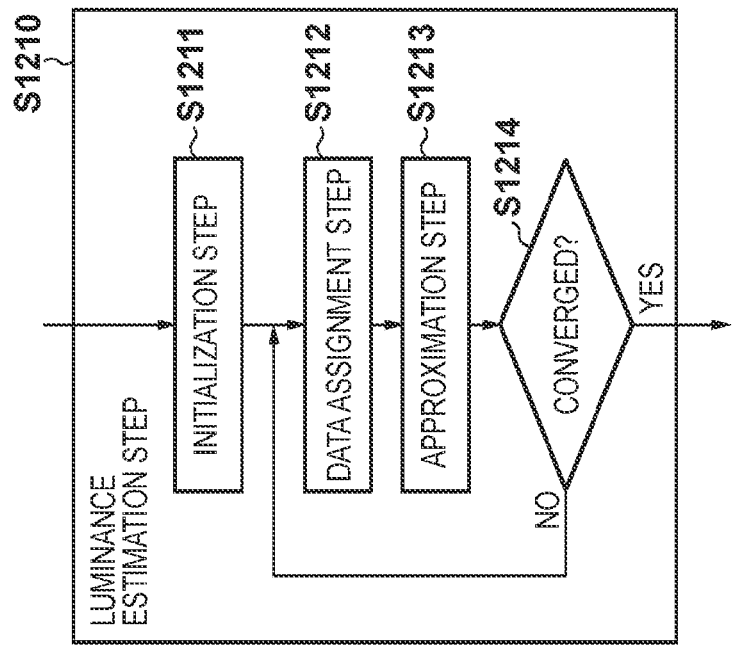
Figures 10A, 10B, 10C:
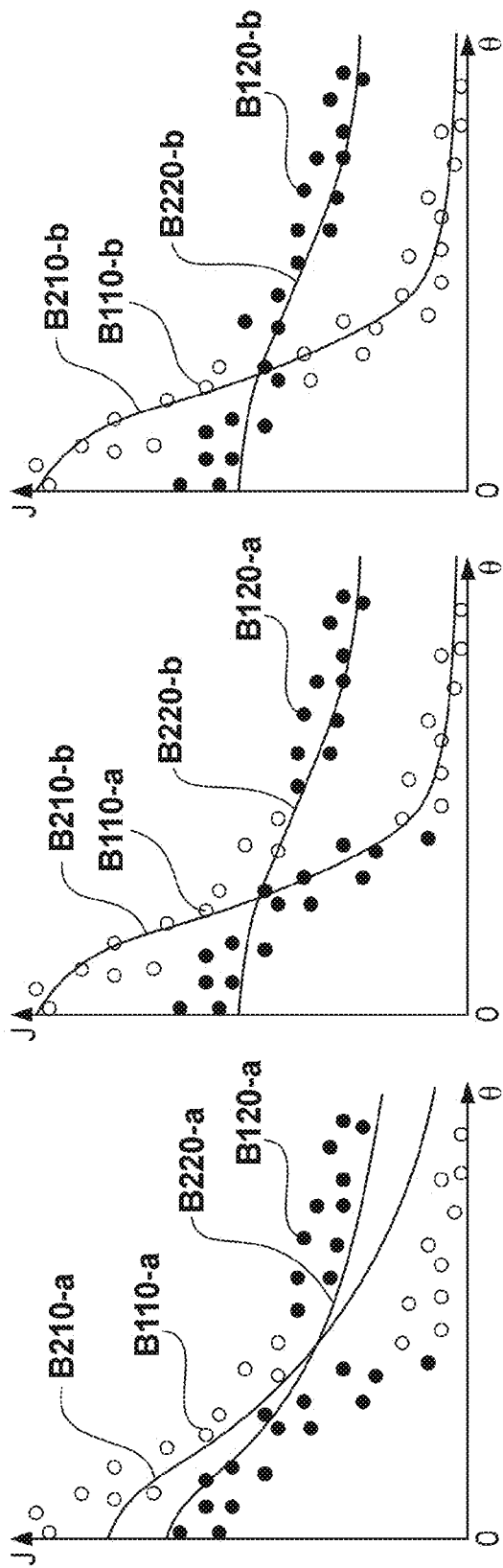
FIGS. 10A to 10C are graphs for explaining a luminance distribution estimation method.

Luminance estimation step S1210 in the second embodiment includes steps shown in FIG. 9A in order to estimate the parameters $C_t$ and $m_t$ of each luminance distribution function $J_t(\theta)$. FIGS. 10A to 10C are conceptual views showing parameter estimation. Parameter estimation processing will be explained with reference to these drawings.

In initialization step S1211 shown in FIG. 9A, the luminance estimation unit 1210 initializes the parameters $C_t$ and $m_t$ and prepares a plurality of luminance distribution functions (luminance distribution models). Initial values may be selected at random. Alternatively, after maximum likelihood estimation is performed for T=1, different values slightly shifted from the estimation result may be set as a plurality of initial values of $C_t$ and $m_t$.

Then, in data assignment step S1212, the luminance estimation unit 1210 assigns each observation point $p_j = (\theta_j, J_j)$ to each luminance distribution function $J_t(\theta)$. For example, the observation point is assigned to a luminance distribution function in which an estimated luminance value obtained upon inputting the surface normal direction $\theta_j$ of the observation point $p_j$ to the luminance distribution function $J_t(\theta)$ becomes closest to the luminance value $J_j$ of the observation point. That is, a data set $S_t$ for estimating the luminance distribution function $J_t(\theta)$ is defined as:

$$P_j \in S_t \text{ if } \arg\!\min_C |J_c(\theta_j) - J_j| = t, \text{ for } \forall P_j \tag{13}$$

Expression (13) is equivalent to labeling each observation point with the index of the luminance distribution function. FIG. 10A shows this example. In FIG. 10A, curves B210-a and B220-a are luminance distribution functions initialized by different parameters. Each observation point is assigned to a closest luminance distribution function. More specifically, an observation point s indicated by an open circle such as a point B110-a is assigned to the luminance distribution function B210-a, and an observation point s indicated by a filled circle such as a point B120-a is assigned to the curve B220-a.

Then, in approximation step S1213, the luminance estimation unit 1210 updates the respective luminance distribution functions $J_t(\theta)$ by maximum likelihood fitting using observation point groups $S_t$ assigned to the respective luminance distribution functions. FIG. 10B shows this example. In FIG. 10B, curves B210-b and B220-b are curves obtained by updating the curves B210-a and B220-a shown in FIG. 10A by using the observation point groups assigned to them.

After updating all (two in this example) luminance distribution functions $J_t(\theta)$, the luminance estimation unit 1210 specifies again a closest luminance distribution function for each observation point $p_j$, and determines whether luminance estimation step S1210 has converged (S1214). More specifically, the luminance estimation unit 1210 determines whether a luminance distribution function specified for each observation point $p_j$ is the same as a luminance distribution function already assigned to the observation point $p_j$. If the two functions are the same for all observation points, the luminance estimation unit 1210 determines that luminance estimation step S1210 has converged, and the process advances to next image generation step S1220. If there is an observation point $p_j$ whose specified luminance distribution function is different from the assigned luminance distribution function, the luminance estimation unit 1210 determines that luminance estimation step S1210 has not converged yet, and the process returns to data assignment step S1212 to repeat the above-described processes.

When a mirror reflection model is adopted to the luminance distribution of the target object 400, a Torrance-Sparrow luminance distribution model is applied, as in the first embodiment. In this case, the t-th luminance distribution function $J_t(\theta, \alpha, \beta)$ is approximated by:

$$J_t(\theta,\alpha,\beta)=K_{dt}\cdot\cos\alpha+K_{st}(1/\cos\beta)\exp(-\theta^2/m_t) \qquad (14)$$

In equation (14), $K_{dt}$, $K_{st}$, and $m_t$ are the parameters in this model. $\alpha$ and $\beta$ are given by equations (10) and (11), respectively. These parameters are also estimated by function fitting, as in the first embodiment. Even when luminance values are obtained by multiple channels, it is only necessary to estimate luminance distributions separately for the respective channels, as in the first embodiment.

A case in which the number T of luminance distribution functions constituting the luminance distribution characteristic of the target object 400 is known has been described. An estimation example when T is unknown will be explained below.

When T is unknown, a plurality of Ts are set to perform estimation, and T at which distributions are separated most is selected from them. Processing in luminance estimation step S1210 in this case will be explained with reference to FIG. 9B. In FIG. 9B, the processing contents of initialization step S1211, data assignment step S1212, and approximation step S1213, and determination S1214 are the same as those in FIG. 9A. More specifically, in the processing shown in FIG. 9B, the same processes S1211 to S1214 as those in FIG. 9A are performed for a plurality of T variations (T=1, . . . , Tmax), and then separation degree evaluation step S1215 is performed. Note that Tmax is the upper limit of the number of colors of the target object 400. For example, Tmax=5 is set.

In separation degree evaluation step S1215, the luminance estimation unit 1210 defines a separation evaluation value $\lambda_T$ for each T:

$$\lambda_T=(1/T)\Sigma_{t=1}^{T}\|\zeta_t\| \qquad (15)$$

$$\zeta_t=(1/\|S_t\|)\Sigma_{j\in S_t}\{J_j-J_t(\theta_j)\}^3/\epsilon_t^3 \qquad (16)$$

$$\epsilon_t^2=(1/\|S_t\|)\Sigma_{j\in S_t}\{J_j-J_t(\theta_j)\}^2 \qquad (17)$$

In equation (17), $\epsilon_t$ is the square error of an estimated value, and in equation (16), $\zeta_t$ is the degree of distortion centered on the estimated value. As the data set $S_t$ assigned to each luminance distribution function $J_t$ exhibits a shape closer to a normal distribution with respect to $J_t$, the value of the degree $\zeta_t$ of distortion comes closer to 0. In this case, a T value at which the separation evaluation value $\lambda_T$ becomes smallest is set as the estimated value of the number T of luminance distribution functions.

As described above, regardless of whether the number T of luminance distribution functions of the target object 400 is known or unknown, a luminance distribution function is estimated in luminance estimation step S1210, and a training image is generated based on the estimated luminance distribution function in image generation step S1220.

[Training Image Generation Processing]

Training image generation processing in the second embodiment will be explained. When generating a training image, a luminance distribution function needs to be associated with each portion of a target object. This association is performed as follows.

For example, the association can be performed automatically by comparing the magnitudes of the diffuse reflection components of a luminance distribution. According to the approximation equation given by equation (12), luminance distribution functions corresponding to a portion of a bright material and a portion of a dark material can be determined from the magnitude of a luminance value at a portion having a large θ value (for example, θ=1 rad), and the luminance distribution functions can be associated with the respective portions. In the approximation equation given by equation (14), the parameter $K_{dt}$ indicates the intensity of the diffuse reflection component, so luminance distribution functions may be associated in accordance with the magnitude of the parameter $K_{dt}$.

When the luminance distribution functions of multiple channels are estimated for, for example, the color image of the target object 400, the diffuse reflection components of characteristic channels may be compared. For example, when a red portion and green portion are associated, the intensities of diffuse reflection components in the R and G channels can be compared to facilitate association.

Figure 11:
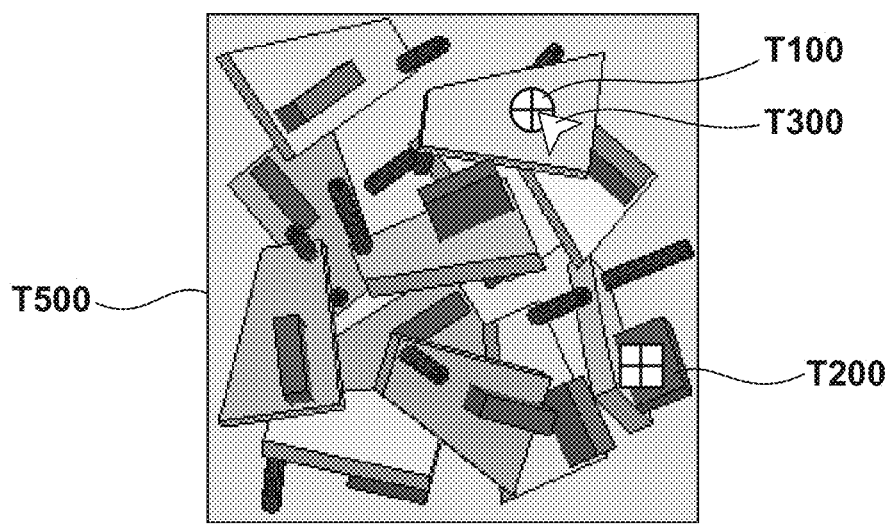
FIG. 11 is a view for explaining color-code designation.

Association may also be performed by prompting the user to designate a plurality of points in a pre-acquired image, and detecting a luminance distribution function to which pixels corresponding to these points contribute. For example, as shown in FIG. 11, a pre-acquired image T500 representing the piled state of the target objects 400 is displayed on a graphic user interface (GUI). The user moves a cursor T300 to designate a bright portion T100 and dark portion T200. By this designation, luminance distribution functions are associated, as shown in FIG. 12. More specifically, assume that observation data at the bright portion T100 is C100 in FIG. 12, and observation data at the dark portion T200 is C200. It is determined from expression (13) that the observation data C100 belongs to the luminance distribution function of the curve B210 in FIG. 12, and the observation data C200 belongs to the luminance distribution function of the curve B220.

After each portion of the target object 400 is associated with a luminance distribution function, a training image can be generated, as in the first embodiment. Processing of generating a dictionary by using training images in subsequent learning step S2000 is the same as that in the first embodiment, and a description thereof will not be repeated.

As described above, even when the surface of the target object 400 has a plurality of colors, a training image which approximates the surface luminance can be generated.

Third Embodiment

The third embodiment according to the present invention will be explained. The first and second embodiments have described that the optical characteristic of the surface of a target object is stable in the normal direction of the surface. However, the optical characteristic of the surface is not always stable. For example, if the surface of a target object undergoes matt finishing, the luminance value changes depending on a portion even on the surface of a target object 400 oriented in the same direction. In some cases, the luminance value similarly changes depending on the surface roughness of a mold in molding or the like without intentional surface treatment. It is considered to add noise to a target object having an unstable optical characteristic of the surface when generating a training image, in order to reproduce the instability of the luminance value. In the third embodiment, the luminance distribution of a target object is estimated in consideration of noise applied when generating a training image.

[Estimation of Luminance Distribution]

In the third embodiment as well as the first embodiment, a dictionary for detecting a target object is generated from generated training images. Dictionary generation processing in the third embodiment is the same as the sequence of FIG. 3B, except for details of processing in luminance estimation step S1210 and subsequent processing. In luminance estimation step S1210 according to the third embodiment, the surface luminance of the target object 400 is estimated as follows based on an observation data distribution obtained from pre-acquired images.

The representation of a luminance distribution by a linear Gaussian kernel model $y(\theta, w)$:

$$y(\theta,\vec{w})=\vec{w}^T\vec{\phi}(\theta) \tag{18}$$

$$\vec{w}=(w_1,\ldots,w_h,\ldots,w_M)^T \tag{19}$$

$$\vec{\phi}(\theta)=\{\phi_1(\theta),\ldots,\phi_h(\theta),\ldots,\phi_M(\theta)\}^T \tag{20}$$

In equations (18) to (20), θ is the angle made by angle made by the normal vector $\vec{N}$ and the direction vector $\vec{H}$ of a reflection center axis 30, as described with reference to FIG. 4. M is the number of kernels and is defined by the user. The angle θ falls within a range of 0° to 90°. For example, if M=9 is set, kernels can be arranged at an interval of about 10°. The parameter w is an M-dimensional vector, and the element $w_h$ (h=1, . . . , M) is a positive real number value. The vector $\vec{\phi}$ is an M-dimensional vector, and the element $\phi_h$ (h=1, . . . , M) is a Gaussian kernel defined by:

$$\phi_h(\theta)=\exp\{-(\theta-\mu_h)^2/2S^2\} \tag{21}$$

In equation (21), $\mu_h$ is the center position of the Gaussian kernel $\phi_h$. It suffices to arrange the kernel center $\mu_h$ within the domain of the angle θ. For example, when M=9 is defined, $\mu_h$ may be set at every 9°. A predicted luminance distribution defined as represented by equation (22) when the luminance distribution is approximated by such a linear Gaussian kernel model will be examined:

$$p(J|\vec{R},\theta)=\int p(J|\vec{w},\theta)p(\vec{w}|\vec{R},\theta)d\vec{w} \tag{22}$$

In equation (22), R is the set vector of observed luminance values. When the total number of observation pixels is N, the set vector R is given by a column vector as represented by:

$$\vec{R}=(J_1,\ldots,J_j,\ldots,J_N)^T \tag{23}$$

In equation (23), $J_j$ is the observation value of a luminance value in the pixel j of observation data. The first term of the right-hand side of equation (22) is the conditional distribution of luminance values and is given by a normal distribution:

$$p(J|\vec{w},\theta)=N\{J|y(\theta,\vec{w}),\epsilon^2\} \tag{24}$$

In equation (24), ϵ is the accuracy parameter. As the accuracy parameter ϵ, the mean of the square error between the estimated luminance function $J(\theta_j)$ and the observed luminance value $J_j$ in the first and second embodiments is used:

$$\epsilon^2=(1/N)\Sigma\{J_j-J(\theta_j)\}^2 \tag{25}$$

Assume that equation (24) is the likelihood function of the weight w, and the conjugate prior distribution is a Gaussian distribution having an expected value $m_0$ and covariance $S_0$:

$$p(\vec{w})=N(\vec{w}|\vec{m}_0,\vec{S}_C) \tag{26}$$

At this time, the second term of the right-hand side of equation (22) serving as a posterior distribution can be represented by a normal distribution:

$$p(\vec{w}|\vec{R},\theta)=N(\vec{w}|\vec{m}_N,\vec{S}_N) \tag{27}$$

$$\vec{m}_N=\vec{S}_N\{\vec{S}_C^{-1}\vec{m}_0+(1/\epsilon^2)\vec{\Phi}^T\vec{R}\} \tag{28}$$

$$\vec{S}_N^{-1}=\vec{S}_0^{-1}+(1/\epsilon^2)\vec{\Phi}^T\vec{\Phi} \tag{29}$$

Φ is called a design matrix and is decided from kernels and observation data:

$$\Phi = \begin{bmatrix} \phi_1(\theta_1) & \cdots & \phi_h(\theta_1) & \cdots & \phi_M(\theta_1) \\ \vdots & \ddots & & & \\ & & \phi_h(\theta_j) & & \phi_M(\theta_j) \\ & & & \ddots & \\ \phi_1(\theta_N) & & \cdots & & \phi_M(\theta_N) \end{bmatrix} \tag{30}$$

It is known that, when the linear Gaussian kernel model of equation (18) is approximated according to the least squares method, the predicted luminance distribution of equation (22) is finally given by:

$$p(J|\vec{R},\theta)=N\{J|\vec{m}_N^T\vec{\phi}(\theta),\sigma_N^2(\theta)\} \tag{31}$$

$$\sigma_N^2(\theta)=\epsilon^2+\vec{\phi}(\theta)^T\vec{S}_N\vec{\phi}(\theta) \tag{32}$$

Note that equation (32) is the variance of the predicted luminance distribution, and the square root $\sigma_N(\theta)$ is the standard deviation of the predicted luminance distribution.

In this manner, after the luminance distribution of the target object 400 is estimated in luminance estimation step S1210, a training image is generated based on the estimated luminance distribution in image generation step S1220.

[Training Image Generation Processing]

Generation of a training image in the third embodiment is similar to that in the first embodiment. More specifically, a training image is generated by calculating a luminance value at a position on a model in the normal direction that corresponds to each pixel when projective transformation is performed for a CAD model in each orientation, and giving the luminance value to the pixel.

The predicted distribution $p(J|R, \theta_k)$ can be obtained from equations (31) and (32) for the angle $\theta_k$ made by the normal direction of a plane projected to the pixel k in a training image to be generated and the reflection center axis.

FIG. 13 shows an example of the predicted distribution of luminance values obtained in the third embodiment. In FIG. 13, a solid line B300 is the center of the predicted luminance distribution with respect to the angle θ. Broken lines B310 and B320 indicate the width of the predicted distribution represented as the standard deviation $\sigma_N(\theta)$ obtained by giving θ to equation (32). A curve B330 indicates a predicted distribution in the luminance direction at $\theta_k$, and a width B340 is a standard deviation $\sigma_N(\theta_k)$. In the third embodiment, a random number is generated in accordance with the predicted luminance distribution, and the obtained value is given to the pixel k, thereby generating a training image.

In this fashion, the luminance value of each pixel on the surface of the target object 400 is decided from the variance of a luminance distribution estimated for the target object 400. A training image can therefore be generated in consideration of variations of the surface luminance of the target object 400.

Fourth Embodiment

The fourth embodiment according to the present invention will be explained. The first embodiment has described an example in which the luminance of the surface of a target object is approximated by a luminance distribution model based on equation (3) or (9). The fourth embodiment further prepares a plurality of parameter candidates as parameters (luminance distribution parameters) for the luminance distribution model. Dictionaries for recognizing a target object are created based on the respective parameter candidates, and an optimum parameter candidate is selected using, as evaluation values, recognition results obtained by applying these dictionaries to an input image (photographed image). Note that the luminance distribution parameters are C and m in equation (3) or $K_d$, $K_s$, and m in equation (9).

Figure 14:
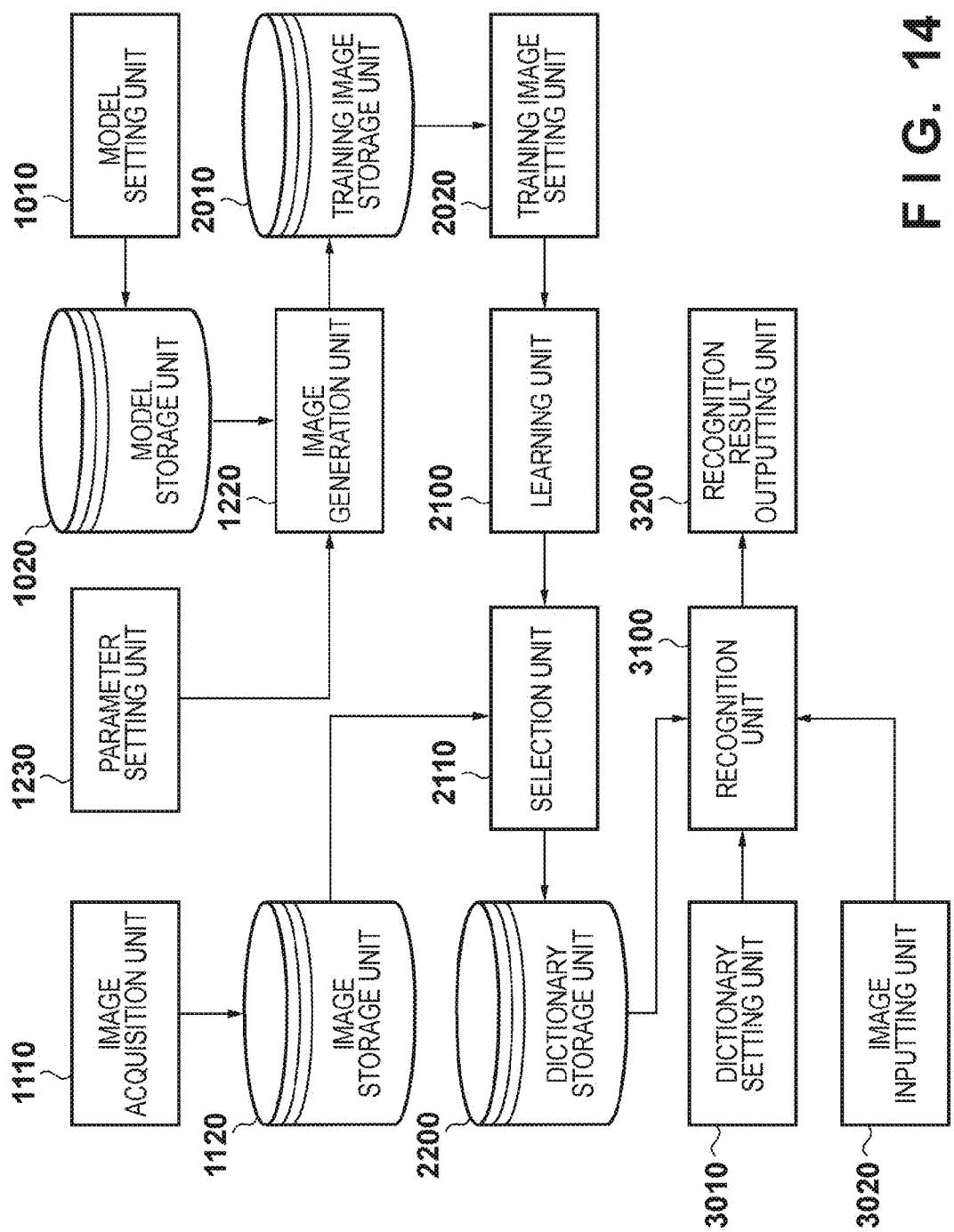
FIG. 14 is a block diagram showing the arrangement of an image processing apparatus in the fourth embodiment.

FIG. 14 shows a basic arrangement for performing image recognition processing in the fourth embodiment. In FIG. 14, the same reference numerals as those in FIG. 1A in the first embodiment denote the same parts, and a description thereof will not be repeated. An image processing apparatus in the fourth embodiment has an arrangement in which the luminance estimation unit 1210 is excluded from the arrangement shown in FIG. 1A and a parameter setting unit 1230 and selection unit 2110 are added to the arrangement shown in FIG. 1A.

[Dictionary Generation Processing (Learning Processing)]

Figure 15A:
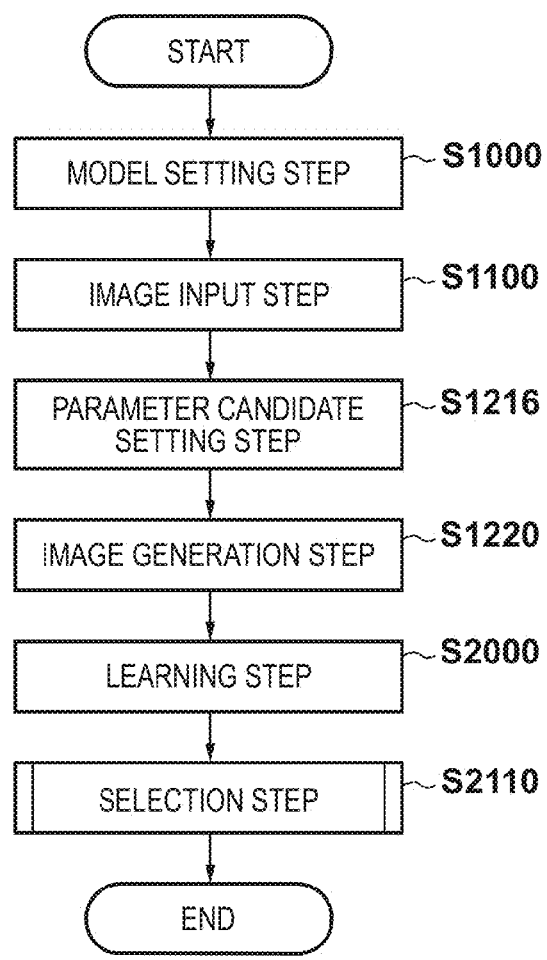
FIGS. 15A and 15B are flowcharts showing learning processing in the fourth embodiment.

Dictionary generation processing in the fourth embodiment complies with the flowchart of FIG. 15A. In model setting step S1000 and image input step S1100 of FIG. 15A, the model of a target object 400 is set to acquire a plurality of pre-acquired images, as in the first embodiment.

In parameter candidate setting step S1216, the parameter setting unit 1230 prepares K patterns of candidates of an image generation parameter for generating a training image. The image generation parameter is a luminance distribution parameter estimated in the first embodiment.

In image generation step S1220, an image generation unit 1220 generates a training image corresponding to each of the prepared image generation parameter candidates of the K patterns by the same method as that in the first embodiment. A set of training images of various orientations generated using the k-th image generation parameter candidate out of all the K patterns is defined as a training image set $S_k$. In learning step S2000, a learning unit 2100 generates K dictionaries by using K respective training image sets $S_k$ (k=1, . . . , K).

Figure 15B:
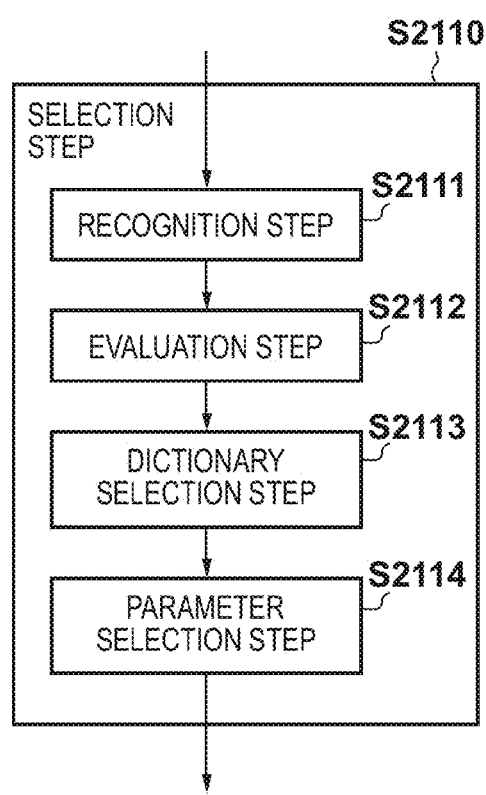

In the selection step, the selection unit 2110 evaluates all pre-acquired images acquired in image input step S1100 by using the K generated dictionaries, and selects an optimum dictionary and image generation parameter based on the evaluation result. Processing in selection step S2110 is shown in the flowchart of FIG. 15B.

In recognition step S2111, the selection unit 2110 performs recognition processing using the dictionary for a pre-acquired image, and estimates the position and orientation of the target object 400 in the pre-acquired image, similar to recognition processing (S3100) in run-time processing described in the first embodiment.

Then, in evaluation step S2112, the selection unit 2110 evaluates the recognition result obtained in recognition step S2111 in the following way. First, the CG image of the target object 400 is generated from a model set in model setting step S1000 based on the estimated position and orientation obtained as the recognition result. At this time, the CG image may be directly generated based on the estimated position and orientation. Alternatively, the CG image may be generated based on the result of more specifically performing matching using a tracking technique. More specifically, the estimated position and orientation of the target object 400 that have been obtained as the recognition result are set as initial values, and the CG image is generated using an estimated position and orientation after more specifically performing matching for the pre-acquired image by using the tracking technique.

The selection unit 2110 compares the edges of the binary images of the generated CG image and pre-acquired image by edge extraction processing to calculate a distance. The selection unit 2110 calculates, as an evaluation value, the sum of distances or an error arising from the sum of squares. More specifically, in evaluation step S2112, the evaluation value of the recognition result is calculated based on the difference at corresponding portions between the model image (CG image) generated from the recognition result and model information, and the image of the target object 400 in the pre-acquired image.

Alternatively, the evaluation may be performed based on a distance residual using a range image. More specifically, based on an estimated position and orientation obtained as the recognition result, the distance of the surface of the target object 400 in the position and orientation is calculated from the model. The calculated distance is compared with distance information corresponding to a pre-acquired image, and the sum of distance residuals on the surface of the target object 400 or an error arising from the sum of squares is calculated as the evaluation value.

Alternatively, the similarity between a training image and a pre-acquired image may be evaluated. In this case, the similarity of the existence region of the target object 400 in the pre-acquired image is compared with a CG image generated based on an estimated position and orientation in the recognition result by normalized correlation or the like. The similarity is then calculated as the evaluation value.

Further, the user may visually check a generated CG image and pre-acquired image and evaluate the difference. For example, the error of the positional shift or orientation shift is defined at several levels (for example, about five levels), and the user inputs a subjective evaluation value. Alternatively, a combination of the aforementioned various evaluation values, for example, the linear sum of these evaluation values may be used as the evaluation value.

In evaluation step S2112, if evaluation values using the K dictionaries are obtained for each pre-acquired image, the evaluation values obtained for each pre-acquired image are accumulated for each dictionary, and the accumulated evaluation value is set as an evaluation value for this dictionary.

In dictionary selection step S2113, the selection unit 2110 selects, as an optimum dictionary, a dictionary having a best evaluation value calculated in evaluation step S2112. A good evaluation value is a smaller value when the evaluation value is a detection error such as an edge error or distance residual, and a larger value when the evaluation value is similarity. The good evaluation value depends on the definition of the evaluation value.

In parameter selection step S2114, the selection unit 2110 selects, as an optimum image generation parameter for generating a training image, an image generation parameter candidate used to generate the dictionary selected in dictionary selection step S2113. More specifically, in image generation step S1220, an image generation parameter used to generate a training image set $S_k$ corresponding to the selected dictionary is selected.

In this manner, a parameter (luminance distribution parameter) for generating an optimum training image to be used to generate an optimum dictionary can be decided by evaluating an actual recognition result. An optimum dictionary is created using a training image generated based on the decided parameter. Hence, optimum recognition processing using the dictionary can be performed.

Modification of Embodiments

In the above-described first to fourth embodiments, an input image in run-time processing may be used as a pre-acquired image. In this case, an appropriate training image can be dynamically generated upon an environmental change in run-time processing.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-074860 filed Mar. 29, 2013 which is hereby incorporated by reference herein in its entirety.

What is claimed is:

1. An image processing apparatus for generating a training image of an object to be used to generate a dictionary to be referred to in image recognition processing of detecting the object from an input image, comprising:
    a first inputting unit configured to input a luminance image of the object and a range image of the object;
    a first obtaining unit configured to obtain normal directions of first regions included in the range image based on the range image;
    a second obtaining unit configured to obtain an observation data distribution representing correspondence between the obtained normal directions of the first regions and luminance values of second regions, corresponding to the first regions, in the luminance image; and
    a generation unit configured to generate a training image of the object based on the observation data distribution,
    wherein the first inputting unit, the first obtaining unit, the second obtaining unit, and the generation unit are implemented by using at least one processor.

2. The apparatus according to claim 1, further comprising an estimation unit configured to estimate luminance data of a surface of the object based on the observation data distribution,
    wherein the generation unit generates the training image of the object based on the estimated luminance data.

3. The apparatus according to claim 2, wherein the estimation unit estimates the luminance data based on the observation data distribution and a predetermined luminance model.

4. The apparatus according to claim 3, wherein the estimation unit comprises:
    a preparation unit configured to prepare a plurality of luminance models;
    an assignment unit configured to assign the observation data distribution to one of the plurality of luminance models; and
    an update unit configured to update the plurality of luminance models, wherein each luminance model is updated based on the observation data distribution assigned to the luminance model.

5. The apparatus according to claim 4, wherein the assignment unit assigns the observation data distribution to the luminance model in which a luminance value obtained by inputting a normal direction represented by the observation data distribution is closest to a luminance value represented by the observation data distribution.

6. The apparatus according to claim 4, further comprising a determination unit configured to cause the assignment unit and the update unit to repeat processing until assignment destinations of the observation data distribution before and after the update coincide with each other.

7. The apparatus according to claim 2, wherein the generation unit performs projective transformation corresponding to a plurality of orientations of the object on model information of the object, and gives a luminance value complying with the luminance data in a normal direction of the surface of the object represented by the model information after the projective transformation so as to generate training images for the respective orientations.

8. The apparatus according to claim 7, wherein the model information comprises computer-aided design (CAD) data, and the training image comprises a computer graphics image.

9. The apparatus according to claim 2, wherein the generation unit determines, from a variance of the luminance data, a luminance value corresponding to a normal direction of the surface of the object.

10. The apparatus according to claim 1, wherein the first inputting unit inputs the luminance image and the range image obtained by capturing a state in which objects to be detected are piled.

11. The apparatus according to claim 1, wherein the first inputting unit inputs the luminance image and the range image obtained by capturing the object in a plurality of orientations.

12. The apparatus according to claim 1, further comprising a range image generation unit configured to generate the range image from the luminance image and model information of the object.

13. The apparatus according to claim 1, further comprising a learning unit configured to generate the dictionary using the training image.

14. The apparatus according to claim 13, further comprising:
a second setting unit configured to set a plurality of image generation parameter candidates for generating the training image; and
a selection unit configured to select a dictionary to be used in the image recognition processing from a plurality of dictionaries generated by the learning unit based on a plurality of training images generated by the generation unit using the plurality of image generation parameter candidates.

15. The apparatus according to claim 14, wherein the selection unit comprises:
a recognition unit configured to recognize a position and orientation of the object from the luminance image and the range image based on each of the plurality of dictionaries; and
a calculation unit configured to calculate, for a recognition result corresponding to each of the dictionaries, an evaluation value based on a difference at corresponding portions between a model image generated from the recognition result and the model information, and an image of the object in the luminance image, so that the selection unit selects the dictionary.

16. The apparatus according to claim 1, further comprising:
a second inputting unit configured to input an image obtained by capturing the object; and
a recognition unit configured to recognize a position and orientation of the object from the input image by referring to the dictionary.

17. The apparatus according to claim 13, wherein the first inputting unit and the second inputting unit input images obtained by capturing the object under a same environmental condition or similar environmental conditions.

18. The apparatus according to claim 1, wherein the range image represents a position of a surface of the object.

19. An image processing method of generating a training image of an object to be used to generate a dictionary to be referred to in image recognition processing of detecting the object from an input image, comprising:
using a processor to perform the steps of:
inputting a luminance image of the object and a range image of the object;
obtaining normal directions of first regions included in the range image based on the range image;
obtaining an observation data distribution representing correspondence between the obtained normal directions of the first regions and luminance values of second regions, corresponding to the first regions, in the luminance image; and
generating a training image of the object based on the observation data distribution.

20. A non-transitory computer readable medium storing a computer-executable program for causing a computer to perform the steps of:
inputting a luminance image of an object and a range image of the object;
obtaining normal directions of first regions included in the range image based on the range image;
obtaining an observation data distribution representing correspondence between the obtained normal directions of the first regions and luminance values of second regions, corresponding to the first regions, in the luminance image; and
generating a training image of the object based on the observation data distribution.

21. An image processing apparatus for generating a training image of an object to be used to generate a dictionary to be referred to in image recognition processing of detecting the object from an input image, comprising:
a first setting unit configured to set model information of an object to be detected;
a first inputting unit configured to input a luminance image of the object, and a range image;
an obtaining unit configured to obtain an observation data distribution representing correspondence between a normal direction of a surface of the object and a luminance value based on the luminance image and the range image;
an estimation unit configured to estimate a luminance distribution of the surface of the object based on the luminance image and the range image; and
a generation unit configured to generate a training image of the object based on the model information and the luminance distribution,
wherein the first setting unit, the first inputting unit, the obtaining unit, the estimation unit, and the generation unit are implemented by using at least one processor,
wherein the estimation unit estimates the luminance distribution based on the observation data distribution and a predetermined luminance distribution model,
wherein the estimation unit comprises:
a preparation unit configured to prepare a plurality of luminance distribution models;
an assignment unit configured to assign the observation data distribution to one of the plurality of luminance distribution models; and
an update unit configured to update the plurality of luminance distribution models, wherein each luminance distribution model is updated based on the observation data distribution assigned to the luminance distribution model.

22. The apparatus according to claim 21, wherein the assignment unit assigns the observation data distribution to the luminance distribution model in which a luminance value obtained by inputting a normal direction represented by the observation data distribution is closest to a luminance value represented by the observation data distribution.

23. The apparatus according to claim 21, further comprising a determination unit configured to cause the assignment unit and the update unit to repeat processing until assignment destinations of the observation data distribution before and after the update coincide with each other.

24. The apparatus according to claim 21, wherein the model information comprises computer-aided design (CAD) data, and the training image comprises a computer graphics image.

25. The apparatus according to claim 21, wherein the generation unit determines, from a variance of the luminance distribution, a luminance value corresponding to a normal direction of the surface of the object represented by the model information.

26. The apparatus according to claim 21, further comprising a range image generation unit configured to generate the range image from the luminance image and the model information.

27. An image processing method of generating a training image of an object to be used to generate a dictionary to be referred to in image recognition processing of detecting the object from an input image, comprising:

using a processor to perform the steps of:
setting model information of an object to be detected;
inputting a luminance image of the object, and a range image;
obtaining an observation data distribution representing correspondence between a normal direction of a surface of the object and a luminance value based on the luminance image and the range image;
estimating a luminance distribution of the surface of the object based on the luminance image and the range image; and
generating a training image of the object based on the model information and the luminance distribution,
wherein the luminance distribution is estimated in the estimating based on the observation data distribution and a predetermined luminance distribution model, and
wherein the estimating comprises:
preparing a plurality of luminance distribution models;
assigning the observation data distribution to one of the plurality of luminance distribution models; and
updating the plurality of luminance distribution models, wherein each luminance distribution model is updated based on the observation data distribution assigned to the luminance distribution model.

28. A non-transitory computer readable medium storing a computer-executable program for causing a computer to perform the steps of:

setting model information of an object to be detected;
inputting a luminance image of the object, and a range image;
obtaining an observation data distribution representing correspondence between a normal direction of a surface of the object and a luminance value based on the luminance image and the range image;
estimating a luminance distribution of the surface of the object based on the luminance image and the range image; and
generating a training image of the object based on the model information and the luminance distribution,
wherein the luminance distribution is estimated in the estimating based on the observation data distribution and a predetermined luminance distribution model, and
wherein the estimating comprises:
preparing a plurality of luminance distribution models;
assigning the observation data distribution to one of the plurality of luminance distribution models; and
updating the plurality of luminance distribution models, wherein each luminance distribution model is updated based on the observation data distribution assigned to the luminance distribution model.

* * * * *